United States Patent [19]

Burger

[11] 3,809,832
[45] May 7, 1974

[54] TENSION SUPERVISORY APPARATUS FOR CONVEYOR TRANSPORT SYSTEMS DETECTING BREAKAGE OR MALFUNCTION IN A CABLE OR THE LIKE

[75] Inventor: Hans Burger, Schaffhausen, Switzerland

[73] Assignee: Georg Fischer Aktiengesellschaft, Schaffhausen, Switzerland

[22] Filed: Nov. 1, 1972

[21] Appl. No.: 302,981

[30] Foreign Application Priority Data
Nov. 12, 1971 Switzerland...................... 16469/71

[52] U.S. Cl.......... 200/61.18, 200/61.13, 200/82 R, 104/178
[51] Int. Cl............................................. B61b 11/02
[58] Field of Search............ 200/61.13, 61.18, 81 R, 200/82 C, 41, 82 R; 104/173, 178, 179

[56] References Cited
UNITED STATES PATENTS
| | | | |
|---|---|---|---|
| 3,239,618 | 3/1966 | Sengel......................... | 200/61.13 X |
| 3,115,847 | 12/1963 | Turner et al....................... | 104/178 |
| 3,221,667 | 12/1965 | Watt............................... | 104/178 X |
| 2,890,427 | 6/1959 | Ingham et al................. | 200/81 R X |
| 2,901,570 | 8/1959 | Gratzmuller.................. | 200/81 R X |

Primary Examiner—James R. Scott
Attorney, Agent, or Firm—Flynn & Frishauf

[57] ABSTRACT

The cable or chain of a suspension-type conveyor is guided around a tension sheave, which is movable under influence of a suspended weight, spring or the like with change in loading on the cable to maintain the tension constant. A fluid cylinder-piston arrangement is provided, the piston being connected to the movable sheave, for example by being connected to the weight, and the cylinder being filled with hydraulic fluid, on both sides of the piston, the end of the piston being connected together by a bypass, return line which preferably contains a flow constriction. Upon slow movement of the tension sheave, pressure will always equalize on both sides of the piston over the bypass line; sudden jolts, however, cannot be rapidly equalized and also move the fluid cylinder which is connected to operate a switch upon excursion thereof to control operation of the transport system.

13 Claims, 2 Drawing Figures

TENSION SUPERVISORY APPARATUS FOR CONVEYOR TRANSPORT SYSTEMS DETECTING BREAKAGE OR MALFUNCTION IN A CABLE OR THE LIKE

The present invention relates to supervisory apparatus for conveyor transport systems and more particularly for supervisory apparatus in connection with the tensioning arrangement for a transport chain or transport cable (hereinafter collectively called "cable") of the transport system.

Transport systems such as suspension conveyors, aerial tramways, suspended ski lift or chair lifts, or other transport systems in which a cable is used to move a transported element over long distances and a long and endless path required apparatus in order to maintain a predetermined constant tension in the cable, so that smooth running of the transported element is obtained, with uniform speed. Various types of tensioning systems are known (see, for example, the book "Stetigforderer", published by Krauskopf-Verlag, Mainz, Germany, 1967) in which the tension cable is placed under stress by a return sheave. To obtain constant tension, a force is applied at the center of the sheave counter the direction of force due to the cable, and which acts in the same sense as the direction of the cable. This force can be obtained in various ways, for example, by a piston-cylinder system subject to a pressure fluid; by a spring-system, or, most simply, by a weight secured to a chain or cable and guided to be suspended freely by a pully or the like. The tension sheave of the transport cable is then usually secured to a frame, or skid, or the like, which is movable in the direction in which the transport cable exerts tension.

It is desirable to provide supervisory apparatus for the drive of the transport system, and also for the tension arrangement and it has been customary to provide a limit switch which, upon excessive excursion of the tensioning apparatus, for example due to a break in the transport cable, would provide an alarm signal, or control other emergency systems.

Limit switches have a disadvantage in that they only become effective if the cable breaks, but cannot be effective with respect to operation of the transport system itself. For example, upon jolts or sudden changes in motion of the transport cable, such as upon stalling or extreme changes in condition thereof, limit switches will not respond; yet, the drive apparatus should be controlled, automatically, under those conditions as well.

It is an object of the present invention to provide a simple supervisory control system for use in combination with a tensioning device for cable-operated transport systems, for example suspended transport systems, and which will respond to sudden jolts or abrupt changes in operating condition of the transport system, as reflected by sudden changes in tension on the transport cable.

SUBJECT MATTER OF THE PRESENT INVENTION

Briefly, a cylinder-piston arrangement is provided having a cylinder component and a piston component. One of these components, for example the piston component, is connected to move with motion of the tension sheave, for example by being adjustably secured to a suspended weight. The other component, for example the cylinder component is movably retained in holders or guideways, and is arranged to operate a switch upon excursion thereof. The cylinder is filled with a fluid, on both sides of the piston, and at the end of the cylinder communication is provided to a bypass or circulating line shortcircuiting both sides of the piston. Preferably, the connection between the piston ends and the circulating line includes constrictions, for example adjustable diaphragms or chokes. Slow changes in tension are readily compensated by the fluid through the bypass line and, even if the piston should move within the cylinder, the cylinder itself will not move in its guideways. Sudden jolts, or rapid changes in tension or the like indicative of abnormal operating conditions or a cable break cannot, however, be quickly compensated by the bypass line and movement of the piston will cause movement of the cylinder, thus tripping the supervisory switches which are connected to effect suitable alarm or other control functions.

The invention will be described by way of example with reference to the accompanying drawings, wherein.

Figure 1:
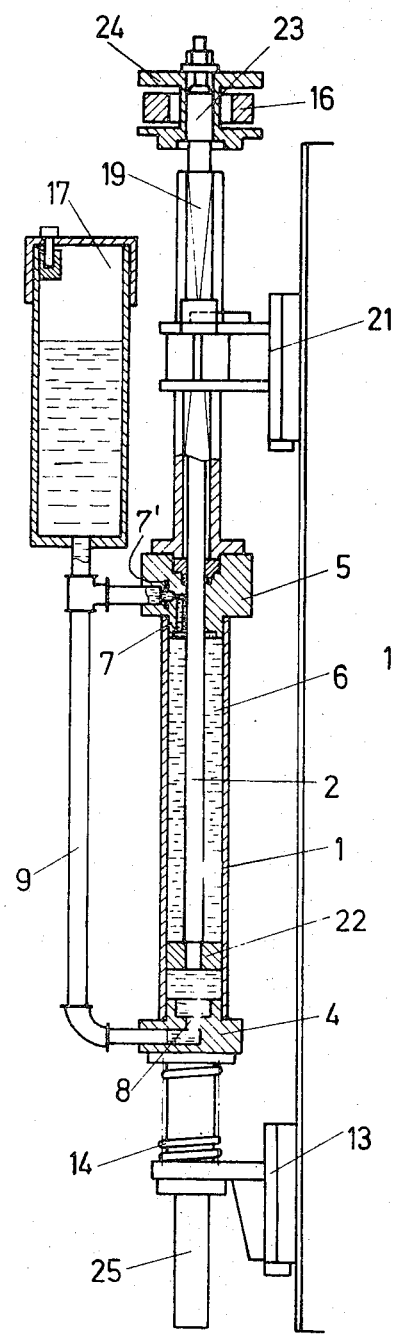
FIG. 1 is a schematic front view of the apparatus, partly in section.

A cylinder 1 has retained therein a piston 22 to which a piston rod 2 is secured. Piston 22 is movable in the cylinder chamber which is filled with a suitable fluid, for example hydraulic oil. A follower bracket 24 is secured to the upper end 23 of the piston rod 2, the follower bracket 24 being removable. A forked lever 16 engages in a groove of the follower bracket 24. Lever 16 is secured in a bracket 15 by means of a shear pin 33 and holding pin 16, and bracket 15 is secured to a weight 3 which is connected to a cable or chain 3a which, in turn, connects to a skid, movable frame, or the like on which the tension sheave for the transport system is located. To permit constructing cylinder 1 and, with it, piston rod 2 with only limited longitudinal extent, bracket 15 is preferably adjustable with respect to the weight 3 to provide for ready adjustment of the supervisory system with respect to the position of the weight 3 when used with any particular cable.

Figure 2:
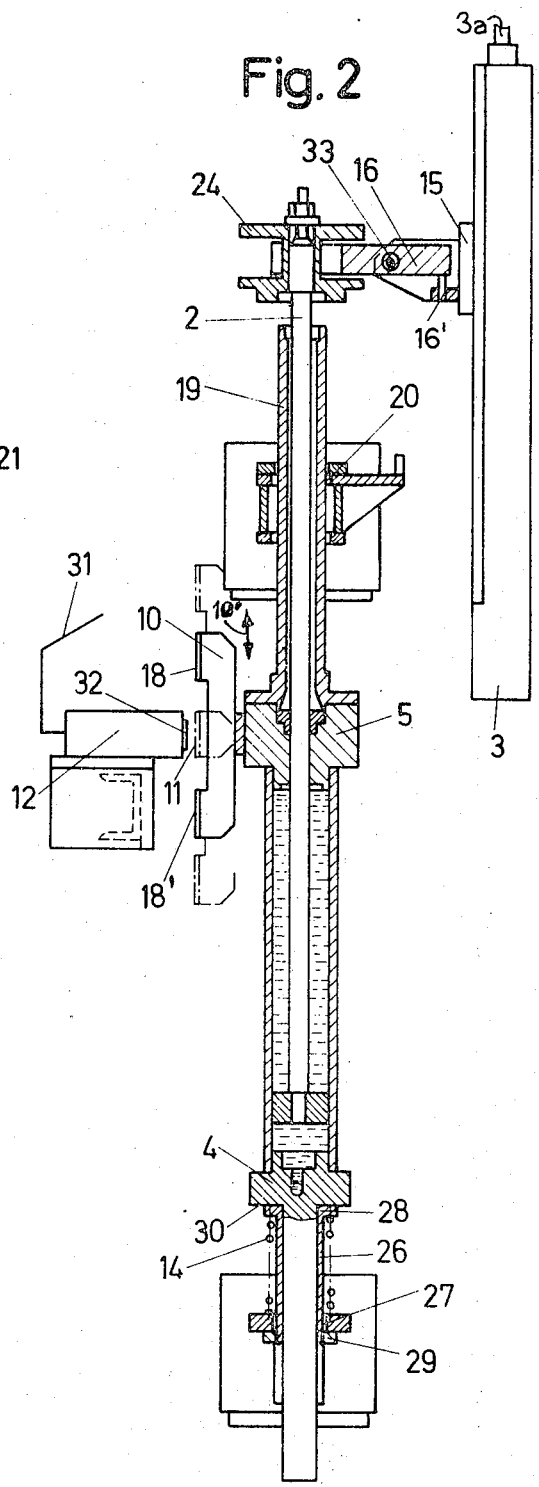
FIG. 2 is a schematic side view, partly in section, of the apparatus of FIG. 1, and taken at a 90° angle with respect to FIG. 1.

Cylinder 1 is closed at both its upper and lower ends by closure caps 4, at the bottom, and 5, at the top. An extension 19 is secured to the top cap 5. Extension 19 is guided in a bore 20 of a fixed bracket 21, the arrangement being so taken that the cylinder 1 is restrained against rotation and is only guided for longitudinal movement. The lower cap 4 is formed with an extended guide pin 25 which is surrounded by a guide sleeve 26. Sleeve 26 is guided in a bore 27 of a fixed bracket 13, for vertical movement. Sleeve 26 is formed at one end, as shown in FIGS. 1 and 2 the upper end, with a flange 28; the lower end is threaded and an internally threaded ring 29 is screwed on sleeve 26, ring 29 bearing against the lower edge of the bracket 13. A tensioning spring 14 surrounds the guide sleeve 26 between the flange 28 and bracket 13. The position of the cylinder 1, as seen in the Figures, is the normal or rest position, in which a shoulder 30 of the lower cylinder cap 4 fits against flange 28, which, in turn, is supported by spring 14. The guide pin 25 is slidable in the sleeve 26.

The cylinder caps 4 and 5 are formed with transverse bores 7, 8 to permit fluid within the cylinder chamber 6 to be connected from both sides of the piston 22 by means of a bypass or circulating line 9. Cylinder 2 is preferably filled with hydraulic oil as a pressure transfer medium, although other fluids, including compressible fluids may be used. The transverse cross section of the bores 7, 8, are selected to be smaller than the cross section of the circulating line 9, to form constrictions or chokes. Bore 7 has an adjustable diaphragm opening 7' placed therein, to form an adjustable constriction. A similar diaphragm can be included in bore 8. The circulating line 9 is connected to a pressure equalizing vessel 17, likewise filled with pressure fluid. The upper cylinder cap 5 has an electrical contact bail 10 secured thereto which is supplied with a pair of switch operating means 18, 18'. A non-contacting type control switch 12 is located opposite the contact plates 18. Switch 12 has a sensing position 32, which senses presence of one or the other of switch operating means 18, 18'. A sensing position 32, in the normal position of cylinder 1, is located between switch operating means 18, 18'. A control or alarm connection 31 connects switch 12 to a central control panel for the drive of the transport system.

Operation: The length of the transport cable, under normal operating conditions, changes only slowly and uniformly, for example due to temperature differences, changes in loading or the like. The tensioning sheave is subject to analogous excursion and thus the suspended weight 3 also moves slowly and gradually, carrying with it piston 22 in cylinder 1, with uniform speed over small distances. During such movement, piston 22 displaces the pressure fluid, upon upward movement of the tensioning system 3 through bore 7 (the choke passage and diaphragm 7') to move hydraulic fluid into the circulating line 9, for supply to the bottom of cylinder 22 through bore 8. Upon downward motion of the tensioning system, flow of the pressure fluid will be in reverse direction. Cylinder 1, during such slow flow is maintained in its central position, that is, in the normal or rest position by balance of its own weight against spring 14.

A rapid change in the length of the transport cable, for example due to a break, or any jolt to which the transport system is subjected and which is transferred to the tension sheave will cause a rapid change in the position of the weight 3. This movement is transmitted to the piston rod 2, and hence to the piston 22, which will rapidly cause pressure buildup at one side of the piston, depending on the direction of transmitted movement. This buildup of pressure cannot be rapidly dissipated through the constricted passages 7, 7', 8, thus causing vertical shift of the cylinder 1 in axial direction. Downward shift of cylinder 1 will thus move the switch bail 10 downwardly, so that the switch operating means 18, 18' will be placed in the lower chain dotted position, and switch operating means 18 will be opposite position 32 as indicated at 11; upward movement will move the switch bail 10 into the upper double chain dotted position and plate 18' will be at position 11 opposite switching position 32. In both latter cases, switch 12 will respond and provide a control or alarm signal over line 31 to the central control panel of the drive, to disconnect the drive, and could control selected programmed sequences.

Various changes and modifications may be made within the scope of the inventive concept; for example, it is not necessary that the piston be connected to a suspended weight and the cylinder operate a contact-less switch; other switches may be used, and the relative position of piston and cylinder, with respect to their connections and control of the switches may be reversed. Control of movement of the piston (with reference to FIGS. 1 and 2) can also be obtained directly from the tension sheave, or from another sensing element which changes its position in accordance with tension on the transport cable.

Various types of switches may be used, and, for flexibility in installation the position of the switch, the switch operation element is preferably adjustable, as indicated schematically by arrow 10' with respect to bail 10, to adjust the position of bail 10 on the upper cap 5, along the wall of cylinder 1 or on the lower cap, or on any other component movable with the cylinder 1. Flap-controlled switches, optical switches and the like may also be used.

I claim:

1. Tension supervisory apparatus for conveyor transport systems, in which a suspended tension weight (3) is movable in accordance with change in loading on the system to maintain its tension at a predetermined level comprising
   a piston-cylinder system having a cylinder (1) and a piston (2) movable in the cylinder and located intermediate the ends thereof;
   connection means (15, 16, 24, 33) connecting the piston (22) to said weight (3) so that movement of said weight is transferred to the piston;
   support means (13, 21) movably guiding the cylinder (1);
   means (14) resiliently retaining said cylinder (1) in a predetermined rest position;
   a fluid circulation line (9) interconnecting the ends of the cylinder (1) between opposite surfaces of the piston (22) to permit circulation of fluid in the cylinder upon movement of the piston (22) therein;
   and switch means (12) fixed with respect to said support means (13, 21) located to sense excursion of said cylinder (1) from said rest position and effecting switching upon movement of said cylinder upon sudden changes in tension of the system causing excursion of the cylinder which is not compensated by fluid circulating through the fluid circulation line.

2. Apparatus according to claim 1 wherein the support means comprises slide bearing means (19, 20, 21; 25, 27, 13) guiding the cylinder (1) for sliding movement.

3. Apparatus according to claim 1, wherein the cylinder (1) is closed at both ends; and
   duct means (7, 8) are provided connecting the ends of the cylinder component to said circulating line (9).

4. Apparatus according to claim 1, wherein the piston (22) has a piston rod (2);
   the connection means comprises a forked member (16) at least in part surrounding the piston rod (2);
   and a support bracket (15) adjustably connecting said forked member (16) to said weight (3).

5. Apparatus according to claim 1 wherein the cylinder (1) is closed at both ends;
duct means (7, 8) are provided connecting the ends of the cylinder 1 to said circulating line (9), said duct means at least in part having a diameter which is small with respect to the diameter of the circulating line (9).

6. Apparatus according to claim 5 wherein the duct means comprises a constriction or choke.

7. Apparatus according to claim 5 wherein the duct means comprises a diaphragm (7') of variable diameter opening.

8. Apparatus according to claim 1 further comprising a fluid supply reservoir (17) in fluid communication with said circulating line (9) to form a fluid equalizing vessel.

9. Apparatus according to claim 1 comprising a switch operating bail (10) secured to said cylinder (1) and operating said switch (12) upon excursion of said cylinder by a predetermined amount from the rest position.

10. Apparatus according to claim 9 comprising two switch operating elements located on the bail, on either side, respectively, with respect to the switch (12) to operate the switch upon excursion of the cylinder (1) in either direction.

11. Apparatus according to claim 9 wherein the position of the bail on the cylinder (1) is adjustable.

12. Apparatus according to claim 1 in which
said connection means includes a bracket (15) vertically adjustably mounted on said weight (3).

13. Apparatus according to claim 1 wherein said cylinder comprises an extension (19) which projects vertically, said support means (13, 21) guiding said extension non-rotatably but permitting vertical sliding movement and comprising a fixed bracket (21) having an aperture, said extension (19) projecting into the aperture.

* * * * *